(12) United States Patent
Straub (10) Patent No.: US 10,491,695 B2
(45) Date of Patent: Nov. 26, 2019

(54) AUTOSAVE WITH ACROSS USER SESSION UNDO SUPPORT

(71) Applicant: Oracle International Corporation, Redwood Shores, CA (US)

(72) Inventor: Christian David Straub, Palo Alto, CA (US)

(73) Assignee: Oracle International Corporation, Redwood Shores, CA (US)

(*) Notice: Subject to any disclaimer, the term of this patent is extended or adjusted under 35 U.S.C. 154(b) by 688 days.

(21) Appl. No.: 14/667,260

(22) Filed: Mar. 24, 2015

(65) Prior Publication Data

US 2016/0057240 A1 Feb. 25, 2016

Related U.S. Application Data

(60) Provisional application No. 62/040,505, filed on Aug. 22, 2014.

(51) Int. Cl.

| | |
|---|---|
| G06F 11/14 | (2006.01) |
| G06F 11/34 | (2006.01) |
| G06F 9/451 | (2018.01) |
| H04L 29/06 | (2006.01) |
| H04L 29/08 | (2006.01) |
| G06F 3/0484 | (2013.01) |

(52) U.S. Cl.
CPC .......... *H04L 67/22* (2013.01); *G06F 3/0484* (2013.01); *G06F 9/451* (2018.02); *H04L 65/1069* (2013.01); *H04L 67/42* (2013.01)

(58) Field of Classification Search
CPC ..... H04L 67/22; H04L 65/1069; H04L 67/42; G06F 11/1446; G06F 3/0484; G06F 9/4443; G06F 11/3438

USPC ........................................................ 709/227
See application file for complete search history.

(56) References Cited

U.S. PATENT DOCUMENTS

| | | | |
|---|---|---|---|
| 6,668,338 | B1 | 12/2003 | Todd et al. |
| 7,003,695 | B2 | 2/2006 | Li |
| 7,207,034 | B2 | 4/2007 | Burke et al. |
| | | (Continued) | |

FOREIGN PATENT DOCUMENTS

| | | |
|---|---|---|
| JP | 2011509489 | 3/2011 |
| JP | 2017527901 | 9/2017 |
| | (Continued) | |

OTHER PUBLICATIONS

"Insider Mac OS X 10.7 Lion: Auto Save, File Versions and Time Machine," AppleInsider, http://forums.appleinsider.com/t/119771/insider-mac-os-x-10-7-lion-auto-save-file-versions-and-time-machine; retrieved Dec. 29, 2014, 14 pages.

(Continued)

*Primary Examiner* — Philip J Chea
*Assistant Examiner* — Wing Ma
(74) *Attorney, Agent, or Firm* — Kilpatrick Townsend & Stockton LLP (57) ABSTRACT

Systems and methods are disclosed that, in various embodiments, record a complete action history (user actions) that created a data set. The action history can then be incorporated as part of the data set. Given a saved object, a path can be constructed between an initial state (e.g., one with no content) to a final state (e.g., the saved content). By proceed backwards in the action history, a user can continue undoing actions all the way to the initial state.

18 Claims, 6 Drawing Sheets

(56) References Cited

U.S. PATENT DOCUMENTS

| | | | |
|---|---|---|---|
| 7,818,718 B2 | 10/2010 | Wedel et al. | |
| 8,010,507 B2 | 8/2011 | Poston et al. | |
| 8,751,464 B1* | 6/2014 | Weiss | G06Q 10/10 |
| | | | 707/695 |
| 8,756,204 B2 | 6/2014 | Cuneo et al. | |
| 2003/0177202 A1* | 9/2003 | Suda | G06F 17/30861 |
| | | | 709/218 |
| 2005/0081105 A1 | 4/2005 | Wedel et al. | |
| 2008/0162590 A1* | 7/2008 | Kundu | G06F 11/1471 |
| 2009/0177703 A1* | 7/2009 | Cuneo | G06F 17/2288 |
| 2010/0082580 A1* | 4/2010 | DeFrang | G06F 8/71 |
| | | | 707/706 |
| 2011/0012929 A1* | 1/2011 | Grosz | G06K 9/6267 |
| | | | 345/661 |
| 2011/0078246 A1* | 3/2011 | Dittmer-Roche | |
| | | | G06F 17/2288 |
| | | | 709/205 |
| 2011/0106776 A1* | 5/2011 | Vik | G06F 9/451 |
| | | | 707/698 |
| 2011/0209052 A1* | 8/2011 | Parker | G06F 3/0483 |
| | | | 715/255 |
| 2011/0289161 A1* | 11/2011 | Rankin, Jr. | G06Q 10/107 |
| | | | 709/206 |
| 2012/0110087 A1* | 5/2012 | Culver | G06F 17/5004 |
| | | | 709/205 |
| 2012/0151495 A1* | 6/2012 | Burckhardt | G06F 9/485 |
| | | | 718/106 |
| 2013/0066837 A1* | 3/2013 | Colrain | G06F 17/30371 |
| | | | 707/674 |
| 2013/0117238 A1* | 5/2013 | Gower | G06F 11/1412 |
| | | | 707/684 |
| 2014/0222919 A1* | 8/2014 | Nysetvold | H04L 65/403 |
| | | | 709/204 |
| 2014/0253574 A1* | 9/2014 | Brown | G06T 1/0007 |
| | | | 345/545 |
| 2014/0258228 A1 | 9/2014 | Bhide | |
| 2014/0258894 A1* | 9/2014 | Brown | G06F 8/38 |
| | | | 715/762 |
| 2014/0258968 A1* | 9/2014 | Brown | G06F 17/21 |
| | | | 717/103 |
| 2014/0258969 A1* | 9/2014 | Brown | G06F 8/30 |
| | | | 717/103 |
| 2014/0258970 A1* | 9/2014 | Brown | G06F 8/47 |
| | | | 717/103 |
| 2014/0282826 A1* | 9/2014 | Bastide | G06F 17/246 |
| | | | 726/1 |
| 2014/0297516 A1* | 10/2014 | Brown | G06F 3/04817 |
| | | | 705/39 |
| 2015/0149404 A1* | 5/2015 | Lock | H04L 65/403 |
| | | | 707/608 |
| 2015/0186301 A1* | 7/2015 | Lashley | G06F 12/1425 |
| | | | 710/268 |
| 2015/0199411 A1* | 7/2015 | Greenspan | G06F 16/2474 |
| | | | 715/229 |
| 2016/0055226 A1* | 2/2016 | Bruening | G06F 16/275 |
| | | | 707/611 |

FOREIGN PATENT DOCUMENTS

| | | |
|---|---|---|
| WO | 2013066889 | 5/2013 |
| WO | 2016029111 | 2/2016 |

OTHER PUBLICATIONS

"Flood," https://github.com/pboyer/flood/blob/master/README.md, retrieved Dec. 23, 2014, 3 pages.

"Recovering from mistakes or problems," http://wiki.blender.org/index.php/Doc:2.6/Manual/Vitals/Undo_and_Redo, retrieved Dec. 23, 2014, 10 pages.

"See the history of change made to a file," https://support.google.com/docs/answer/190843?hl=en, retrieved Dec. 29, 2014, 2 pages.

Gliffy Online User Manual, https://www.gliffy.com/user-manual/, retrieved Dec. 29, 2014, 60 pages.

LaTex, Evolved, ShareLaTeX, the Online LaTeX Editor, https://www.sharelatex.com/, retrieved Dec. 29, 2014, 5 pages.

International Application No. PCT/US2015/046288, International Search Report and Written Opinion dated Nov. 26, 2015, 11 pages.

International Application No. PCT/US2015/046288, Written Opinion dated Aug. 30, 2016, 7 pages.

International Application No. PCT/US2015/046288, International Preliminary Report on Patentability dated Nov. 23, 2016, 8 pages.

Arai et al., "Network Management Scheme for Fast Recovery from Operator Error by Network-Wide Rollback", The IEICE Transactions on Communications, The Institute of Electronics, Information and Communication Engineers, vol. J93-B, No. 4, Apr. 2010, pp. 614-624.

Ikegami et al., "Undoable Management User Interface for System Reliability", Information Processing Society of Japan - The Special Interest Groups - Technical Report, Information Processing Society of Japan, vol. 2004, No. 115, Nov. 12, 2004, pp. 79-86.

* cited by examiner

AUTOSAVE WITH ACROSS USER SESSION UNDO SUPPORT

BACKGROUND OF THE INVENTION

An Application Development Framework (ADF) provides a set of pre-defined code/data modules that can be directly/indirectly used in the development of an application. An ADF may also provide tools such as an IDE (integrated development environment), code generators, debuggers, etc. which facilitates a developer in coding/implementing the desired logic of the application in a faster/simpler manner.

In general, an ADF simplifies development of applications by providing re-usable components and integrated development environments, which application developers can use to define user interfaces and application logic by, for example, selecting components to perform desired tasks and defining the appearance, behavior, and interactions of the selected components. Some ADFs are based on a model-view-controller design pattern that promotes loose coupling and easier application development and maintenance. Oracle Application Development Framework is one example of an ADF that utilizes this design pattern.

Oracle ADF includes libraries of standards-based Java Server Faces (JSF) components with built-in HTML5 and Ajax functionality. With these components, web deployed user interfaces can be developed with a level of functionality and interactivity previously reserved for thick-client applications. The components offer data interaction, data visualization, and encapsulated browser side operations in a set of easy to use components that makes rich client application development easier than ever. Oracle ADF further provides a data-binding framework that simplifies binding UI to business services through a simple drag and drop operations in the IDE. This is done while still keeping the independence of the business service from consuming interfaces. With the framework, the UI developer is insulated from the underlying implementation of the business service layer. This makes the process of building the UI truly decoupled from the implementation of the business service layer, better positioning the application for implementation in a service-oriented architecture.

Most modern computer applications, including Oracle ADF, incorporate actions that are carried out in manners that are not at the direct invocation of users. One example is the AUTOSAVE (or auto-save) function, in which an application periodically saves any work done by a user. The auto-save function allows users to continue working with more confidence that if the user's computer system or the application itself fails before the user has had a chance to perform an explicit save of the data, the majority of the user's work will be preserved.

While these autonomous actions are useful in, for example, preserving work that might be lost over a system failure, or saving the user from extra keystrokes, or keeping a screen display free from unnecessary clutter, they may have disadvantages in other respects. One main issue with auto-save is that its invocation removes the ability for a user to undo an operation or redo an operation. In most computer applications, it is usual for the application to maintain a history of actions performed by the user, so that they can be reversed. It is sometimes possible in these environments to step back through a number of actions by repeated use of the UNDO option. Although this function of undoing user actions is useful, current methods are typically limited to a certain number of undo operations in an undo history. Furthermore, the lifetime of the UNDO history usually is only during the user session.

Accordingly, what is desired is to solve problems relating to UNDO histories in applications that employ auto-save, some of which may be discussed herein. Additionally, what is desired is to reduce drawbacks relating to modern cloud-based applications that employ auto-save functionality, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Systems and methods are disclosed that, in various embodiments, record a complete action history (user actions) that created a data set. The action history can then be incorporated as part of the data set. Given a saved object, a path can be constructed between an initial state (e.g., one with no content) to a final state (e.g., the saved content). By proceed backwards in the action history, a user can continue undoing actions all the way to the initial state.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Introduction

Java EE is a standard, robust, scalable, and secure platform that forms the basis for many of today's enterprise applications. Java EE provides a set of specifications for building multi-tier applications using the Java language. In the past, there was a direct correlation between the robust nature of an application to the complexity required to achieve it. However, with the advent of ADFs, such as Oracle ADF, the implementation of extremely rich Java EE applications can be provided by adhering to standard patterns and practices with greatly reduced effort.

With the increased need for organizations to build composite applications that utilize Service Oriented Architecture (SOA) principles, developers are forced to create applications that are extremely agile. Implementing these best practices in agile applications usually involves writing a significant amount of infrastructure code, adding another obstacle for developers building their first Java EE application. In addition to providing robust, performant, and maintainable applications—Oracle ADF provides the infrastructure code to implement agile SOA based applications thereby removing the effort involved in an organization "rolling their own."

Oracle ADF further provides a visual and declarative approach to Java EE development through the Oracle JDeveloper 11 g development tool. Oracle ADF implements the Model-View-Controller design pattern and offers an integrated solution that covers all the layers of this architecture with solution to such areas as Object/Relational mapping, data persistence, reusable controller layer, rich Web user interface framework, data binding to UI, security and customization. Extending beyond the core Web based MVC approach, ADF also integrates with the Oracle SOA and WebCenter Portal frameworks simplifying the creation of complete composite applications.

For example, Oracle ADF makes it easy to develop agile applications that expose data as services by coupling a service interface to the built-in business services in ADF. This separation of business service implementation details is performed in Oracle ADF via metadata. Use of this metadata-driven architecture enables application developers to focus on the business logic and user experience, rather than the details of how services are accessed.

Oracle ADF stores the implementation details of these services in metadata in the ADF Model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

Figure 1:
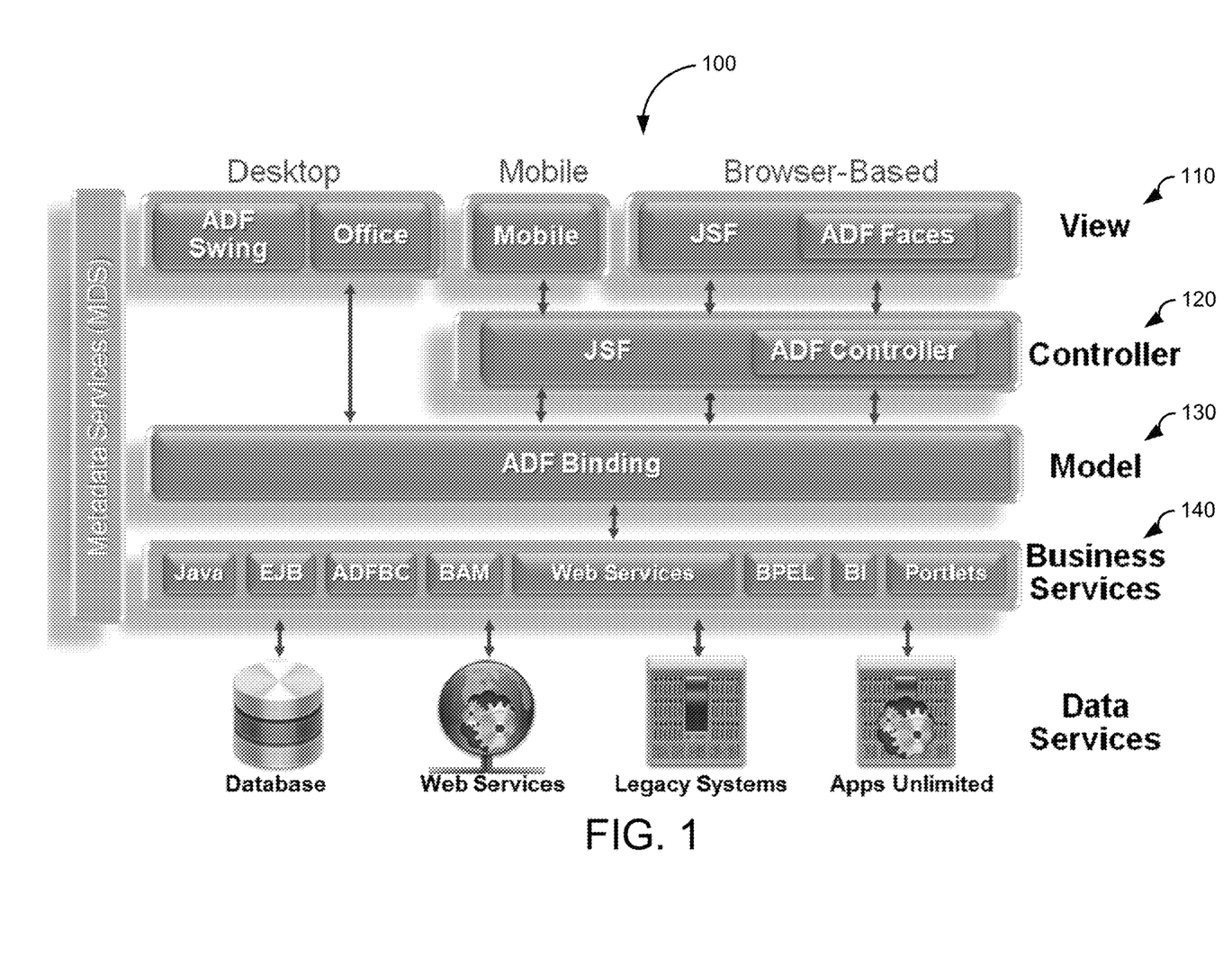
FIG. 1 is a block diagram illustrating an application development framework (ADF) in one embodiment according to the present invention.

FIG. 1 is a block diagram illustrating application development framework (ADF) 100 in one embodiment according to the present invention. FIG. 1 is a simplified illustration of a system that may incorporate various embodiments or implementations of the one or more inventions presented within this disclosure. FIG. 1 may merely be illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

ADF 100 may be embodied as Oracle ADF is one example. Accordingly, ADF 100 is based on a Model-View-Controller (MVC) design pattern. An MVC application is separated into: 1) a model layer that handles interaction with data-sources and runs the business logic, 12) a view layer that handles the application user interface, and 3) a controller that manages the application flow and acts as the interface between the Model and the View layers. Separating applications into these three layers simplifies maintenance and reuse of components across applications. The independence of each layer from the others results in a loosely coupled, Service Oriented Architecture (SOA).

In this embodiment, modules forming an enterprise application are shown as being within ADF 100 to represent that the modules are developed using ADF and then executed within the context of ADF 100. For conciseness, the various internal details of ADF are not shown assuming that the application is developed using the JAVA programming language and Oracle ADF available as part of JDeveloper 10.1.3, a development tool available from Oracle Corporation. However, the features of the present invention described below may be implemented using any desired combination of programming language and application development framework as will be apparent to one skilled in the relevant arts by reading the disclosure provided herein.

In various embodiments, ADF 100 an application to be developed in the form of multiple layers, each layer containing code modules/files implementing desired logic according to pre-defined specification. Thus, in one embodiment, ADF 100 enables the application to be developed as four layers: view layer 110 containing code modules/files that provide the user interface of the application, controller layer 120 containing code modules that control the flow of the application, model layer 130 containing data/code modules that provide an abstraction layer for the underlying data, and business services layer 140 containing code modules that provide access to data from various sources and handles business logic.

Oracle ADF lets developers choose the technology they prefer to use when implementing each of the layers. FIG. 1 shows various options available for developers when building Oracle ADF applications. The glue that integrates the various components of Java EE applications and makes development so flexible is the Oracle ADF model layer. EJB, Web Services, JavaBeans, JPA/EclipseLink/TopLink objects, and many others can all be used as Business Services for the Oracle ADF Model. View layers can include Web based interfaces implemented with JSF, Desktop Swing applications and MS Office front ends, as well as interfaces for mobile devices.

It may be appreciated that the development of the application using such a layered approach often simplifies maintenance and reuse of components/code modules across various applications. Further, the independence of each layer from the other layers results in a loosely coupled service oriented architecture (SOA), which may be desirable when deploying the developed business/enterprise application on multiple/different systems.

In one aspect, view layer 110 represents the user interface of the application being developed. View layer 110 is shown with desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. Oracle ADF support multi-channel access to business services allowing reuse of business services and access from a Web client, a client-server swing desktop-based application, Microsoft Excel spreadsheets, mobile devices such as a smart-phone, or the like.

The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADF 100. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

Controller layer 120 contains code modules/files that control the flow of the application. Each controller object contains software instructions and/or data implemented according to a desired manner of presenting information in view layer 110. The desired manner may include the specific web pages to be displayed when links in another web page are clicked/selected by the user, the page to be displayed when errors occur during execution, indicating the specific data to be stored/retrieved, etc.

In one aspect, controller layer 120 manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming controller layer 120 are often implemented as Java servlets receiving the client requests and sending desired web pages as corresponding responses. Controller objects may also be implemented, for example, as Apache Jakarta Struts controllers or according to the JSF standard.

Model layer 130 contains data/code modules that connect various business services to the objects that use them in the other layers, such as to the controller objects discussed above or directly to desktop applications as shown. Each abstract data objects of model layer 130 provides a corresponding interface that can be used to access any type of business service, executing in underlying business service layer 140. The data objects may abstract the business service implementation details of a service from a client and/or expose data control methods/attributes to view components, providing a separation of the view and data layers.

In one aspect, model layer 130 consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

Oracle ADF emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using an UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, business services layer 140 manages interaction with a data persistence layer. It provides such services as data persistence, object/relational mapping, transaction management, and business logic execution. The Business Services layer in Oracle ADF can be implemented in any of the following options: As simple Java classes, EJB, Web services, JPA objects, and Oracle ADF Business Components. In addition, data can be consumed directly from files (XML or CSV) as well as REST.

Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle ADF Business Components, to provide interaction with databases, web services, legacy systems, application servers, and the like. In one embodiment, business components of business services layer 140 contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Auto-Save with Across User Session Support

Systems and methods are disclosed that, in various embodiments, record a complete action history (user actions) that created a data set. The action history can then be incorporated as part of the data set. Given a saved object, a path can be constructed between an initial state (e.g., one with no content) to a final state (e.g., the saved content). By proceeding backwards in the action history, a user can continue undoing actions all the way to the initial state.

The disclosed techniques provide at least some advantage to traditional approaches where undo state is held in memory. This usually limits undo operations to a predetermined number of undos. Often, this is either a strict number (e.g., remember the last 15 actions) or session based (e.g., online services general allow undo operations until you close the browser). However, these are both limited and the user is limited if the user wishes to further undo prior actions.

Even if the user can explicitly freeze state of the content or enable automatic checkpoints, these solutions only allow the user to return to a point in time for their data. This point may be too far back, too far forward, or have too wide a spread between actions that they do not sufficiently get the user to the point in time that they want to retrieve their data.

In various embodiments, auto saving of a user's work does not sacrifice the ability of the user to throwaway undesirable work (no matter how far back it was created) or re-perform previous operations. As more complicated cloud based applications are developed (i.e. online code editors are a prime example), the ability to restore work to any point in time is invaluable.

Figure 2:
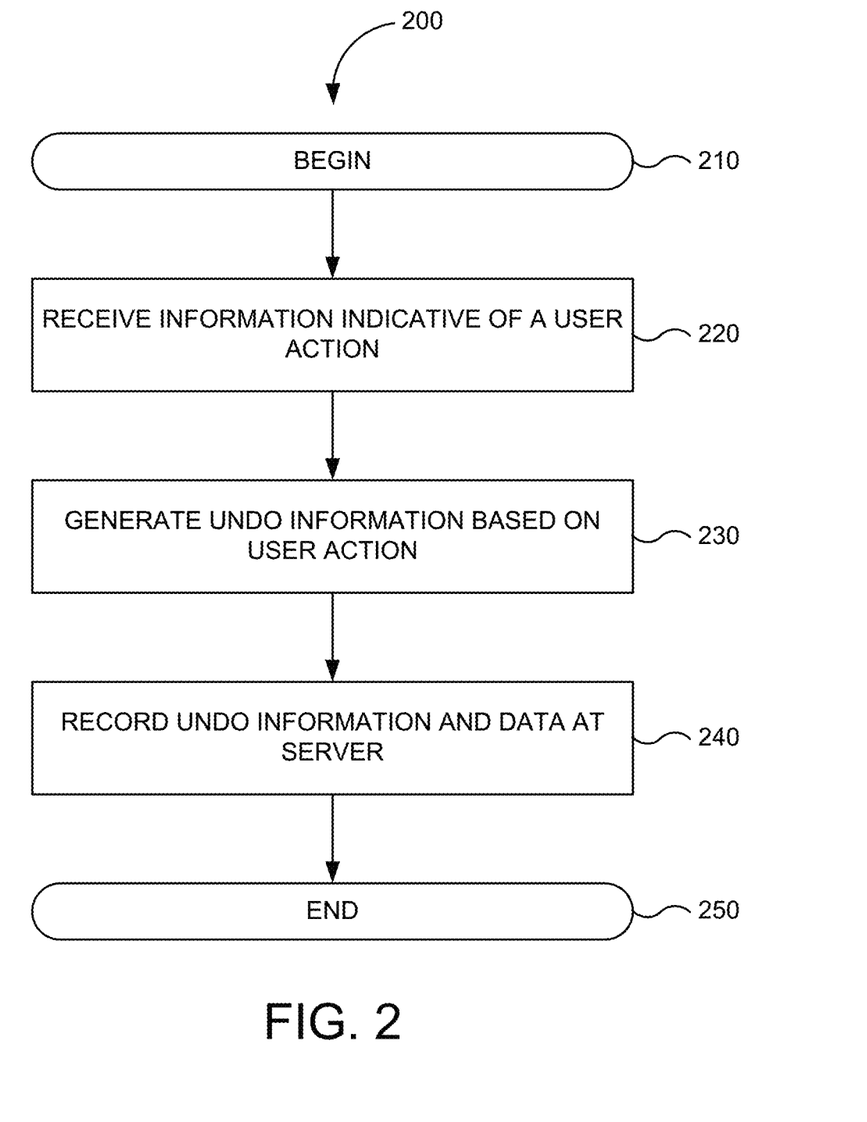
FIG. 2 is a flowchart of a method for generating an across user session history in one embodiment according to the present invention.

FIG. 2 is a flowchart of method 200 for generating an across user session history in one embodiment according to the present invention. Implementations or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, information indicative of a user action is received. A wide variety of computing devices, including some personal computing devices, contain computing capabilities that include systems (e.g., user interface systems) that track and record events/actions. Such events/actions typically include actions directly performed by the user (e.g., key strokes and pointer (mouse or pen) movements), actions indirectly initiated by the user (e.g., actions performed by macros or scripts invoked by the user), automatically invoked actions, or the like. Events/actions can have their own corresponding event/action code. In various embodiments, buffers can be used to store event/action data. An application may receive an indication of a user action and retrieve event/action data from the appropriate buffer.

In step 230, undo information is generated based on the user action. In one embodiment, when any user action occurs, the prior state checksum, current state, and undo instructions along with timestamp information is recorded for that action. In one aspect, a snapshot of the current state is recorded based on the difference between the prior state and the current state. Furthermore, the actions performed during that save session can be recorded.

In step 240, the undo information and the data is recorded at a server. In one embodiment, when an auto save occurs at a client device, all actions created during that save session are sent to a server (or save service). FIG. 2 ends in step 250.

Figure 3:
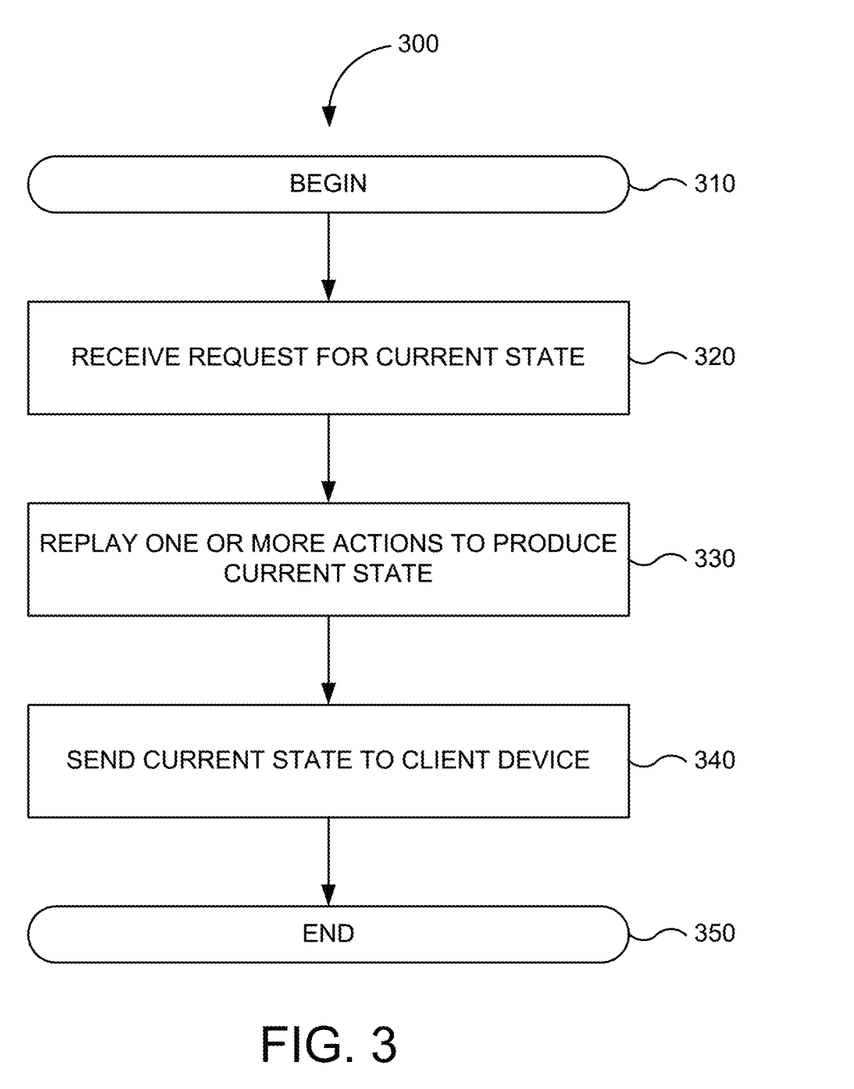
FIG. 3 is a flowchart of a method for retrieving an across user session history in one embodiment according to the present invention.

FIG. 3 is a flowchart of method 300 for retrieving an across user session history in one embodiment according to the present invention. Implementations or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, a request for a current state is received. For example, upon resuming a session, a user may request one or more undo operations that cross the current session. An application may receive an indication of a user action and request the current state data from a server. The server may receive the request and determine how to generate session state information.

In step 330, one or more actions are replayed to produce the current state. For example, one or more recorded actions that were performed during one or more prior sessions can be replayed to generate the current state. The server may evaluate prior snapshots and deltas in order to determine the current state. The instructions can be replayed on the server to produce the current state (ensuring the state and actions match). The action is also recorded along with the data. Reconstructing the data is an optimization so the tip data can be read quickly.

In step 340, the current state is sent to a client device. FIG. 3 ends in step 350.

Figure 4:
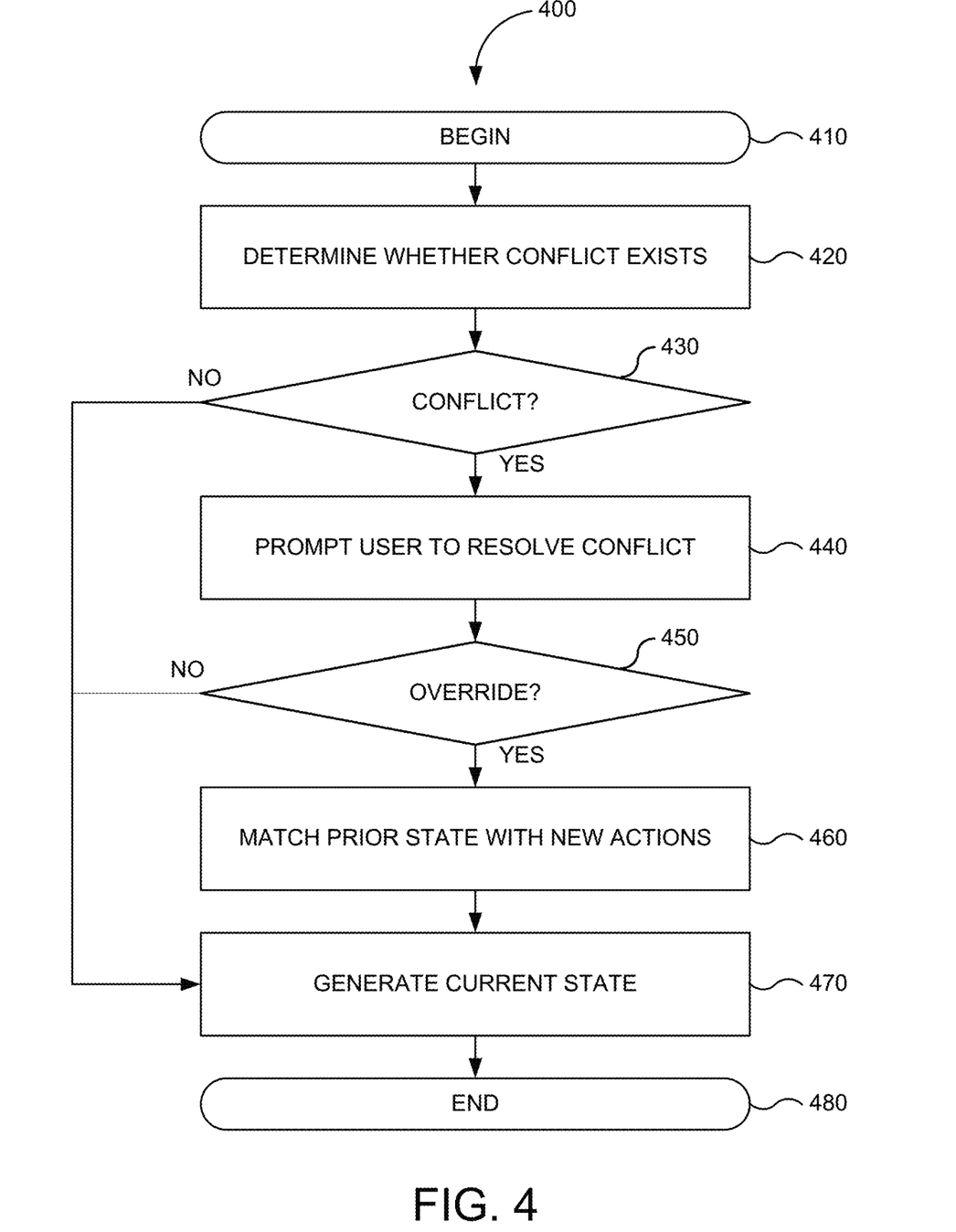
FIG. 4 is a flowchart of a method for resolving conflicts in a session history in one embodiment according to the present invention

FIG. 4 is a flowchart of method 400 for resolving conflicts in a session history in one embodiment according to the present invention. Implementations or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a determination is made whether a conflict exists in a session history. For example, an action may be sent for recording but the initial state does not match the action's prior state checksum. If a determination resolves that a conflict does not exists in step 430, one or more actions are replayed to produce the current state in step 470.

If a determination resolves that a conflict does exists in step 430, in step 440, the user is prompted to resolve the conflict. In various embodiments, the user can be informed that another edit happened. The user can then choose to abandon their actions and replace their data with the conflicting data, or override with their data.

If the user resolves to abandon their actions and replace their data with the conflicting data in step 450, one or more actions are replayed to produce the current state in step 470. The server will match the last prior state checksum with the new actions, then replay the other actions on their client. If the user resolves override data with their data in step 450, a prior state is matched with the new actions in step 460. The server can find the last matching prior state checksum and then replay the user's actions to produce the current state in step 470. FIG. 4 ends in step 450.

CONCLUSION

Systems depicted in some of the figures may be provided in various configurations. In some embodiments, the systems may be configured as a distributed system where one or more components of the system are distributed across one or more networks in a cloud computing system.

Figure 5:
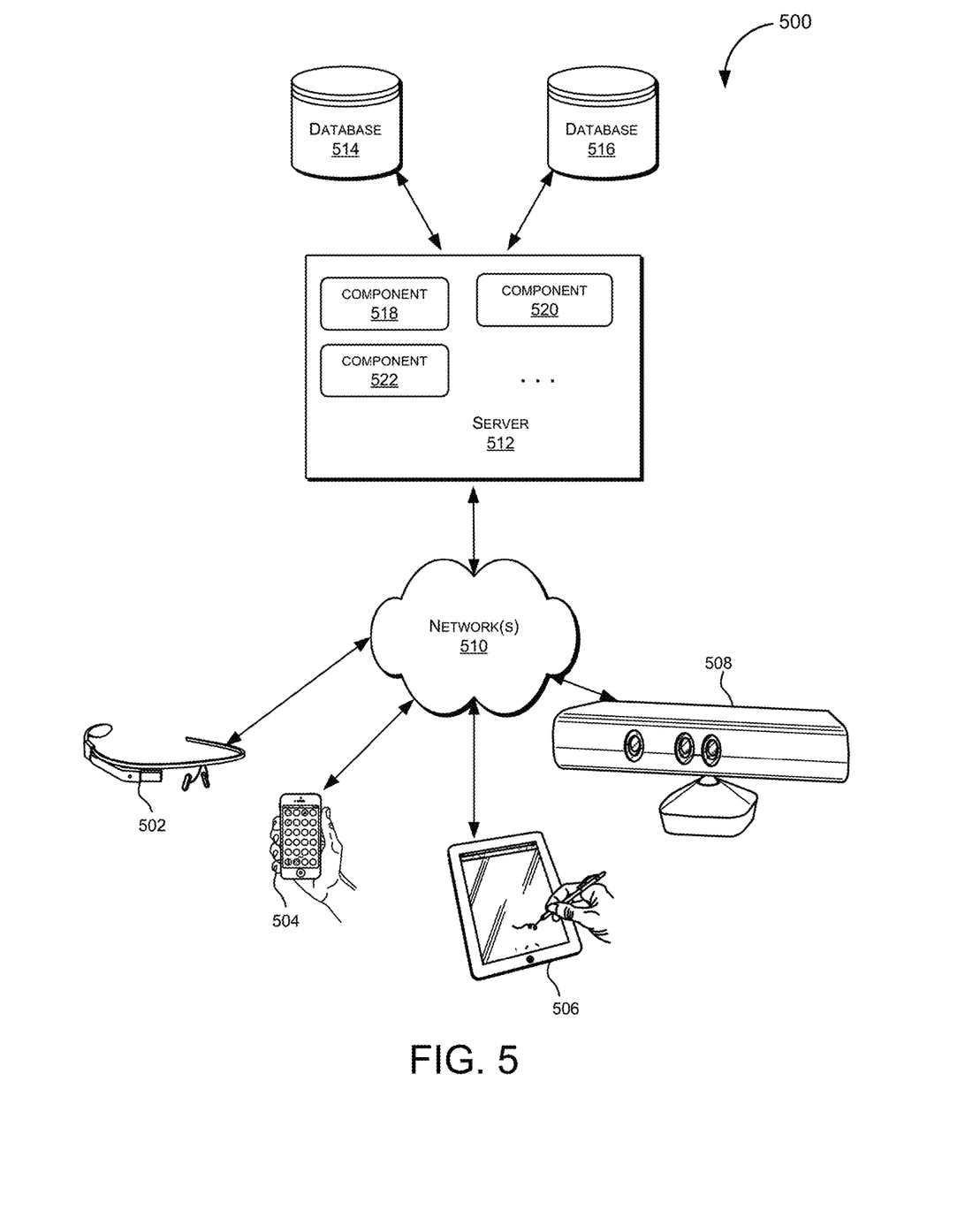
FIG. 5 depicts a simplified diagram of a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

Figure 6:
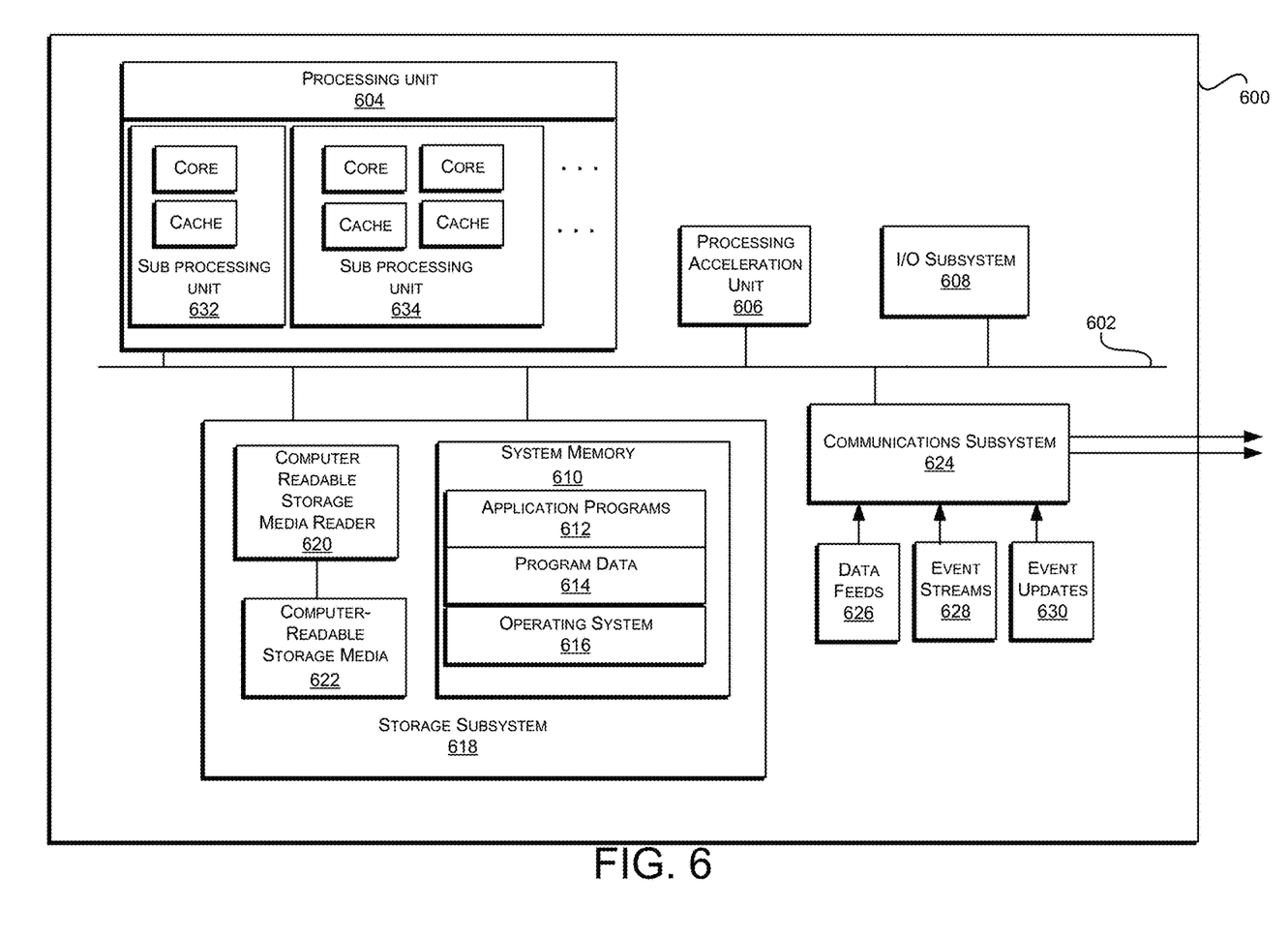
FIG. 6 illustrates an exemplary computer system, in which various embodiments of the present invention may be implemented.

FIG. 6 illustrates an exemplary computer system 600, in which various embodiments of the present invention may be implemented. The system 600 may be used to implement any of the computer systems described above. As shown in the figure, computer system 600 includes a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or 634 with single or multicore processors included in each processing unit. In other embodiments, processing unit 604 may also be implemented as a quad-core processing unit formed by integrating two dual-core processors into a single chip.

In various embodiments, processing unit 604 can execute a variety of programs in response to program code and can maintain multiple concurrently executing programs or processes. At any given time, some or all of the program code to be executed can be resident in processor(s) 604 and/or in storage subsystem 618. Through suitable programming, processor(s) 604 can provide various functionalities described above. Computer system 600 may additionally include a processing acceleration unit 606, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 460 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 4D scanners, 4D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with the present invention.

Storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 4G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626, event streams 628, event updates 630, and the like on behalf of one or more users who may use computer system 600.

By way of example, communications subsystem 624 may be configured to receive data feeds 626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 624 may also be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method comprising:
receiving, at a client computing device, one or more user actions performed during a first user session with a client application of a server application running on a server, wherein the server application is implemented on the server as a model-view-controller design, the one or more actions are performed in a view layer of the model-view-controller design, and the one or more actions create a data set comprising a current state of saved content including a data object from a model layer of the model-view-controller design;
recording, by the client computing device, a prior state checksum, the current state, and undo instructions for the one or more actions and the one or more actions performed during the first user session in a history of the server application on the server, wherein the history is incorporated into the data set, and the undo instructions for the one or more actions provide a path from the current state of the saved content including the data object back to an initial state prior to performance of the one or more actions;
instantiating, by the client computing device, a second user session with the client application of the server application;
generating, by the client computing device, a request during the second user session to undo one or more of the one or more actions performed during the first user session with the client application of the server application;
sending the request to the server application on the server;
receiving, at the client computing device from the server application on the server, a current session state associated with the client application, the current session state representing results of evaluating, the history of the server application on the server, the prior state checksum, the current state, and the undo instructions recorded for the one or more actions performed during the first user session, and replaying, in the server application, the one or more actions based on the evaluating to produce the current session state; and
modifying, by the client computing device, data during the second user session with the client application of the server application based on the received current session state to undo the one or more of the one or more actions performed during the first user session and reflect a state of data during the first user session.

2. The method of claim 1 wherein recording, by the computer, the one or more actions performed during the first user session in the history of the server application comprises generating a snapshot of the current state of the server application.

3. The method of claim 1 wherein recording, by the computer, the one or more actions performed during the first user session in the history of the server application comprises generating a snapshot of the current state of the server application with the prior state checksum of a prior state of the server application or with the undo instructions.

4. The method of claim 1 wherein recording, by the computer, the one or more actions performed during the first user session in the history of the server application comprises generating a snapshot of the current state of the server application based on a difference between the current state and a prior state.

5. The method of claim 1 wherein receiving, at the computer, the current session state associated with the client application comprises replaying one or more of the undo instructions in a snapshot associated with the first user session.

6. The method of claim 1 wherein receiving, at the computer, the current session state associated with the client application comprises evaluating prior snapshots and deltas to determine the current session state.

7. A system comprising:
a client device comprising a hardware processor; and
a non-transitory memory storing a set of instructions which when executed by the processor configure the processor to:
receive, at the client device, one or more user actions performed during a first user session with a client application of a server application running on a server, wherein the server application is implemented on the server as a model-view-controller design, the one or more actions are performed in a view layer of the model-view-controller design, and the one or more actions create a data set comprising a current state of saved content including a data object from a model layer of the model-view-controller design;
record, by the client device, a prior state checksum, a current state, and undo instructions for the one or more actions and the one or more actions performed during the first user session in a history of the server application on the server, wherein the history is incorporated into the data set, and the undo instructions for the one or more actions provide a path from the current state of the saved content including the data object back to an initial state prior to performance of the one or more actions;
instantiate, by the client device, a second user session with the client application of the server application;
generate, by the client device, a request during the second the second user session to undo one or more of the one or more actions performed during the first user session with the client application of the server application;
send the request to the server application on the server; and
receive, at the client device from the server application on the server, a current session state associated with the client application, the current session state representing results of evaluating, the history of the server application on the server, the prior state checksum, the current state, and the undo instructions recorded for the one or more actions performed during the first user session and replaying, in the server application, the one or more actions based on the evaluating to produce the current session state; and
modify, by the client device, data during the second user session with the client application of the server application based on the received current session state to undo the one or more of the one or more actions performed during the first user session and reflect a state of data during the first user session.

8. The system of claim 7, wherein to record the one or more actions performed during the first user session in the history of the server application the processor is configured to generate a snapshot of the current state of the server application.

9. The system of claim 7, wherein to record the one or more actions performed during the first user session in the history of the server application the processor is configured to generate a snapshot of the current state of the server application with the prior state checksum of a prior state of the server application or with undo instructions.

10. The system of claim 7, wherein to record the one or more actions performed during the first user session in the history of the server application the processor is configured to generate a snapshot of the current state of the server application based on a difference between the current state and a prior state.

11. The system of claim 7, wherein to receive the current session state associated with the client application the processor is configured to replay one or more of the undo instructions in a snapshot associated with the first user session.

12. The system of claim 7, wherein to receive the current session state associated with the client application the processor is configured to evaluate prior snapshots and deltas to determine the current session state.

13. A non-transitory computer-readable medium storing computer-executable code, the non-transitory computer-readable medium comprising:
code for receiving, at a client computing device, one or more user actions performed during a first user session with a client application of a server application running on a server, wherein the server application is implemented on the server as a model-view-controller design, the one or more actions are performed in a view layer of the model-view-controller design, and the one or more actions create a data set comprising a current state of saved content including a data object from a model layer of the model-view-controller design;
code for recording, by the client computing device, a prior state checksum, a current state, and undo instructions for the one or more actions and the one or more actions performed during the first user session in a history of the server application on the server, wherein the history is incorporated into the data set, and the undo instructions for the one or more actions provide a path from the current state of the saved content including the data object back to an initial state prior to performance of the one or more actions;
code for instantiating, by the client computing device, a second user session with the client application of the server application;
code for generate, by the client computing device, a request during the second user session to undo one or more of the one or more actions performed during the first user session with the client application of the server application;
code for sending the request to the server application on the server; and
code for receiving, at the client computing device from the server application on the server, a current session state associated with the client application, the current state representing results of evaluating the history of the server application on the server, the prior state checksum, the current state, and the undo instructions recorded for the one or more actions performed during the first user session and replaying, in the server application, the one or more actions based on the evaluating to produce the current session state; and code for modifying, by the client computing device, data during the second user session with the client application of the server application based on the received current state to undo the one or more of the one or more actions performed during the first user session and reflect a state of data during the first user session.

14. The non-transitory computer-readable medium of claim 13 wherein the code for recording the one or more actions performed during the first user session in the history of the server application comprises code for generating a snapshot of the current state of the server application.

15. The non-transitory computer-readable medium of claim 13 wherein the code for recording the one or more actions performed during the first user session in the history of the server application comprises code for generating a snapshot of the current state of the server application with the prior state checksum of a prior state of the server application or with undo instructions.

16. The non-transitory computer-readable medium of claim 13 wherein the code for recording the one or more actions performed during the first user session in the history of the server application comprises code for generating a snapshot of the current state of the server application based on a difference between the current state and a prior state.

17. The non-transitory computer-readable medium of claim 13 wherein the code for receiving the current session state associated with the client application comprises code for: (i) replaying one or more of the undo instructions in a snapshot associated with the first user session; or (ii) evaluating prior snapshots and deltas to determine the current session state.

18. A method comprising:

receiving, at a server, one or more user actions performed on a client computing device during a first user session with a client application of a server application running on the server;

recording, by the server, a prior state checksum, a current state, and undo instructions for the one or more actions and the one or more actions performed during the first user session in a history of the server application on the server;

receiving, by the server, a request instantiated during a second user session to undo one or more of the one or more actions performed during the first user session with the client application of the server application;

generating, by the server, a current session state associated with the client application, the current state representing results of evaluating the prior state checksum, the current state, and the undo instructions recorded for the one or more actions performed during the first user session and replaying, in the server application, the one or more actions based on the evaluating to produce the current session state, wherein the evaluating comprises:

determining, by the server, whether a conflict exists in the history based on the prior state checksum and an initial state;

when the conflict does not exist, generating, by the server, the current session state associated with the client application by replaying the one or more actions;

when a conflict does exist, prompting, by the server, a user of the client device to resolve the conflict either by abandoning the one or more user actions or override conflicting data with the one or more actions;

when the user decides to resolve the conflict by abandoning the one or more user actions, generating, by the server, the current session state associated with the client application by replaying new actions, the current state representing results of evaluating the prior state checksum, the current state, and the undo instructions recorded for the new actions and replaying, in the server application, the new actions based on the evaluating to produce the current session state; and when the user decides to resolve the conflict by override conflicting data with the one or more actions, generating, by the server, the current session state associated with the client application by replaying the one or more actions; and sending, by the server, the current session state to the client application on the client computing device.

* * * * *

UNITED STATES PATENT AND TRADEMARK OFFICE
CERTIFICATE OF CORRECTION

PATENT NO. : 10,491,695 B2  
APPLICATION NO. : 14/667260  
DATED : November 26, 2019  
INVENTOR(S) : Straub Page 1 of 1

It is certified that error appears in the above-identified patent and that said Letters Patent is hereby corrected as shown below:

In the Specification

In Column 2, Line 65, delete "invention" and insert -- invention. --, therefor.

In the Claims

In Column 17, Lines 48-49, in Claim 7, delete "the second the second" and insert -- the second --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*